(No Model.)
P. H. BALD.
TRAINING SULKY.
No. 487,343. Patented Dec. 6, 1892.
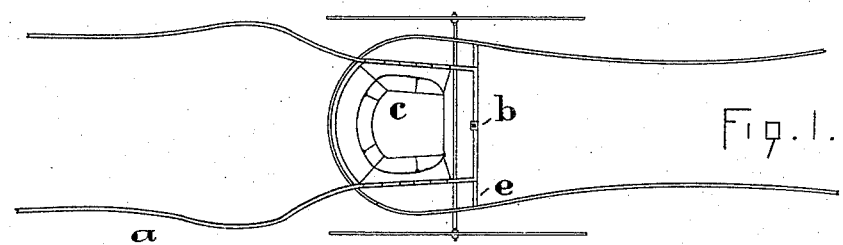
Fig. I.
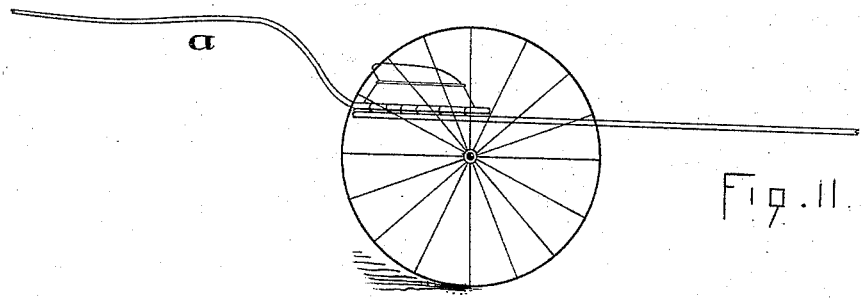
Fig. II.
WITNESSES.
W. F. Nugent.
Christ F. Kilgus.
INVENTOR.
Peter H. Bald

UNITED STATES PATENT OFFICE.

PETER H. BALD, OF LOUISVILLE, KENTUCKY.

TRAINING-SULKY.

SPECIFICATION forming part of Letters Patent No. 487,343, dated December 6, 1892.

Application filed August 16, 1892. Serial No. 443,313. (No model.)

*To all whom it may concern:*

Be it known that I, PETER H. BALD, of Louisville, in the county of Jefferson and State of Kentucky, have invented a new and useful Improvement in Training-Sulkies, which improvement is fully set forth in the following specification, reference being had to the accompanying drawings.

The object of my invention is to educate, train, and develop speed in suckling colts and older horses. By the arrangement of having the trained horse harnessed to the rear connected shafts $a$ of the sulky, Figure 1, and drawing the entire weight, the said shafts being connected to the rear end of the sulky, the weight is thrown between the axle and the suspension-point of the rear shafts, which relieves the animal to be trained from any weight or strain.

In the drawings, Fig. 1 represents a top view of the sulky; Fig. 2, a side view.

$b$ shows the king-bolt, by means of which the rear shafts and seat are connected with the sulky.

$c$ is the seat, and $e$ is the cross-bar of the sulky, to which the king-bolt $b$ is attached. The rear shafts $a$ work independent of the main sulky-shafts, affording freedom of action.

Fig. 2 represents a side view of the sulky.

I claim as my invention—

1. The combination, in a training-sulky, speed-cart, or other vehicle, of a pair of shafts $a$, connected and extending to the rear thereof, substantially as described.

2. The combination, in a training-sulky, speed-cart, or other vehicle, of a pair of rear shafts $a$, connected to the seat $c$ and working on a pivot or king-bolt $b$, substantially as described.

3. The combination, in a training-sulky, speed-cart, or other vehicle, of a pair of rear shafts $a$ with seat $c$, attached and connected thereto.

PETER H. BALD.

Witnesses:
 CHARLES C. ROE,
 M. E. HOPKINS.